United States Patent
Theratil et al.

(10) Patent No.: US 10,968,774 B2
(45) Date of Patent: Apr. 6, 2021

(54) BEARING HOUSING WITH BAFFLES

(71) Applicant: PRATT & WHITNEY CANADA CORP., Longueuil (CA)

(72) Inventors: Ignatius Theratil, Mississauga (CA); Aldo Abate, Longueuil (CA); Nicola Houle, Montreal (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 225 days.

(21) Appl. No.: 16/196,464

(22) Filed: Nov. 20, 2018

(65) Prior Publication Data

US 2020/0116047 A1 Apr. 16, 2020

Related U.S. Application Data

(60) Provisional application No. 62/744,417, filed on Oct. 11, 2018.

(51) Int. Cl.
| | | |
|---|---|---|
| *F01D 25/16* | (2006.01) | |
| *F16C 33/72* | (2006.01) | |
| *F02C 7/06* | (2006.01) | |

(52) U.S. Cl.
CPC ............ *F01D 25/162* (2013.01); *F02C 7/06* (2013.01); *F16C 33/726* (2013.01); *F05D 2240/52* (2013.01)

(58) Field of Classification Search
CPC .... F01D 25/162; F01D 11/003; F01D 25/183; F16C 33/726; F02C 7/06; F05D 2240/126
See application file for complete search history.

(56) References Cited

U.S. PATENT DOCUMENTS

| | | | | |
|---|---|---|---|---|
| 4,273,510 A | * | 6/1981 | Ambrosch | F01D 11/08 415/110 |
| 4,370,094 A | * | 1/1983 | Ambrosch | F01D 11/08 415/119 |
| 7,682,131 B2 | * | 3/2010 | Legare | F01D 5/088 415/208.2 |
| 2008/0080969 A1 | * | 4/2008 | Legare | F01D 5/088 415/170.1 |
| 2014/0144121 A1 | | 5/2014 | Légaré et al. | |

* cited by examiner

*Primary Examiner* — Eldon T Brockman
(74) *Attorney, Agent, or Firm* — Norton Rose Fulbright Canada LLP

(57) ABSTRACT

There is disclosed an assembly for a gas turbine engine that includes a bearing housing circumferentially extending around a central axis thereof and delimiting a bearing cavity for receiving a bearing therein. A controlled gap seal is secured to the bearing housing, the controlled gap seal including a ring and a runner, the runner rotatable relative to the ring about the central axis, the runner spaced apart from the ring by a gap. The gap defines a fluid passage between the bearing cavity and an environment outside the bearing cavity. At least one baffle is secured to a surface of the bearing housing oriented toward the bearing cavity. The at least one baffle is a fin protruding from the surface and extending into the bearing cavity. The at least one baffle disrupts a cylindricality of the surface. A method of operating the bearing assembly is also disclosed.

20 Claims, 4 Drawing Sheets

BEARING HOUSING WITH BAFFLES

TECHNICAL FIELD

The application relates generally to gas turbine engines and, more particularly, to bearing enclosures used in gas turbine engines and featuring seals.

BACKGROUND OF THE ART

Controlled gap seals, such as carbon controlled gap seals, are commonly used in gas turbine engines, generally to seal bearing enclosures, also known as bearing compartments. These seals are designed to run with a tight clearance (e.g., a few thousands of an inch) between a stationary element and a rotating seal runner or shaft, or vice versa. A flow of air may develop between two zones separated by the seal and through the controlled gap, one of which zones may be a bearing enclosure including one or more bearings. In some cases, this flow of air induces excitation of the rotating seal runner. The excitation may result in cracking of the seal runner. Therefore, improvements are possible.

SUMMARY

In one aspect, there is provided an assembly for a gas turbine engine, comprising: a bearing housing circumferentially extending around a central axis thereof and delimiting a bearing cavity for receiving a bearing therein; a controlled gap seal secured to the bearing housing, the controlled gap seal including a ring and a runner such that the ring and the runner are rotatable relative to one another about the central axis, the runner spaced apart from the ring by a gap, the gap defining a fluid passage between the bearing cavity and an environment outside the bearing cavity; and at least one baffle secured to a surface of the bearing housing oriented toward the bearing cavity, the at least one baffle being a fin protruding from the surface and extending into the bearing cavity in proximity to the fluid passage to disrupt a fluid low through the passage.

In another aspect, there is provided a gas turbine engine comprising a bearing housing circumferentially extending around a central axis of the gas turbine engine, the bearing housing delimiting a bearing cavity for receiving a bearing therein, a controlled gap seal secured to the bearing housing, the controlled gap seal including a static component and a rotating component, the rotating component rotatable about the central axis relative to the static component, a gap between the static and rotating components, the gap defining a fluid passage between the bearing cavity and an environment outside the bearing cavity, at least one baffle secured to a surface of the bearing housing oriented toward the bearing cavity, the at least one baffle being a fin protruding from the surface and extending into the bearing cavity, the at least one baffle disrupting a cylindricality of the surface.

In yet another aspect, there is provided a method of operating a bearing assembly, comprising: imparting a pressure differential between a bearing cavity defined by a bearing housing and an environment outside the bearing cavity; fluidly connecting the bearing cavity to the environment via a gap of a controlled gap seal, the gap located between a rotating component and a static component of the controlled gap seal; and disrupting a flow circulating from the gap and inside the bearing cavity with at least one fin located in the bearing cavity and secured to a surface of the bearing housing oriented toward the bearing cavity.

DESCRIPTION OF THE DRAWINGS

Reference is now made to the accompanying figures in which.

DETAILED DESCRIPTION

Figure 1:
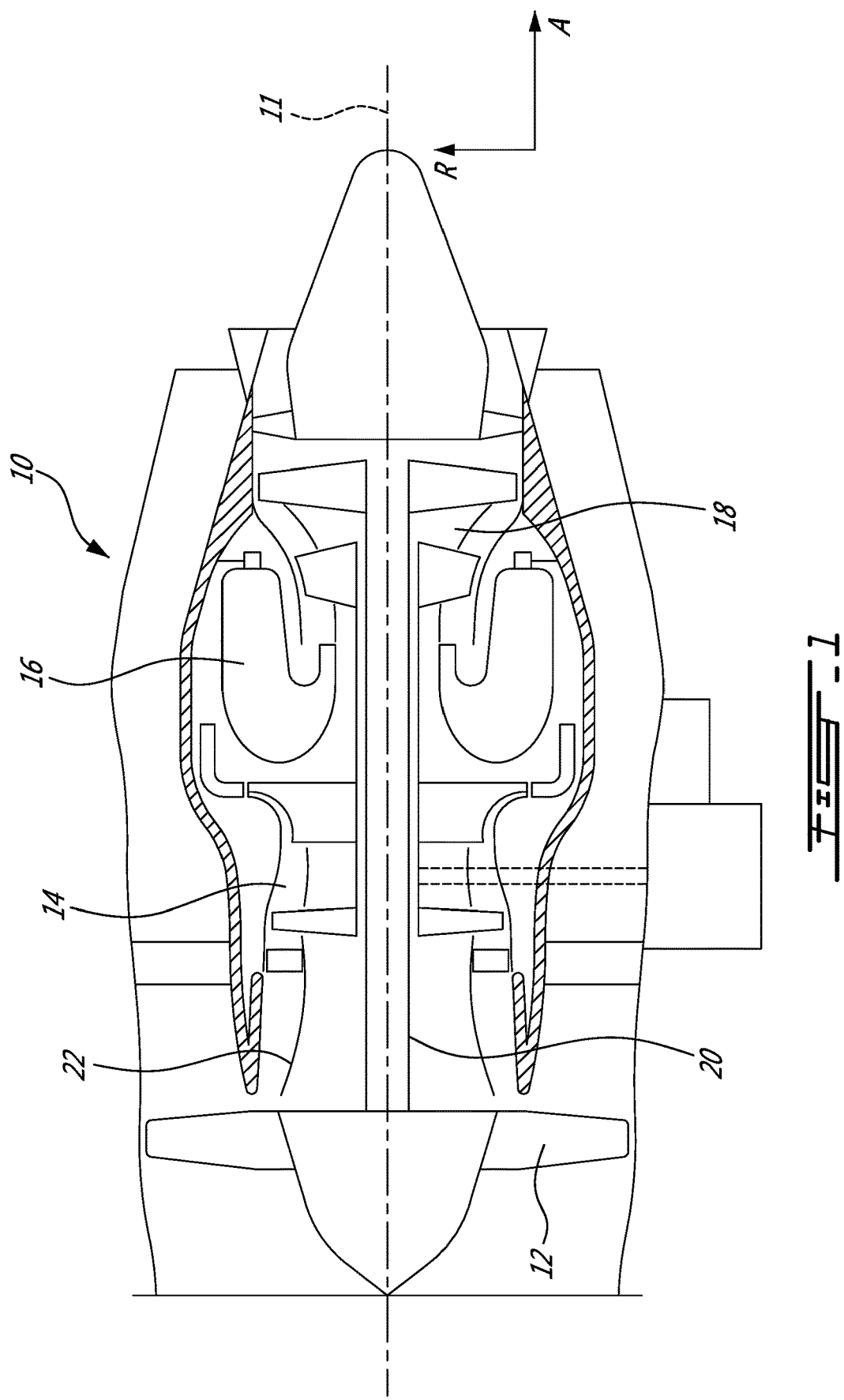
FIG. 1 is a schematic cross-sectional view of a gas turbine engine.

FIG. 1 illustrates a gas turbine engine 10 of a type preferably provided for use in subsonic flight, generally comprising in serial flow communication a fan 12 through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases. The fan 12, the compressor section 14, and the turbine section 18 rotate about a central axis 11 parallel to an axial direction A of the gas turbine engine 10.

The gas turbine engine 10 can include a plurality of bearings which are used to provide a low-friction interface between components which rotate relative to one another, such as between a high pressure shaft 20 and an engine casing 22. Typically, bearings are enclosed in chambers referred to as bearing enclosures, bearing cavities, bearing compartments, among other names. The bearing cavities are partitioned from an environment outside of the bearing cavities, which can be of significantly higher pressure, by seals on each axial side. The seals cooperate with a bearing housing to delimit a bearing cavity.

Figure 2:
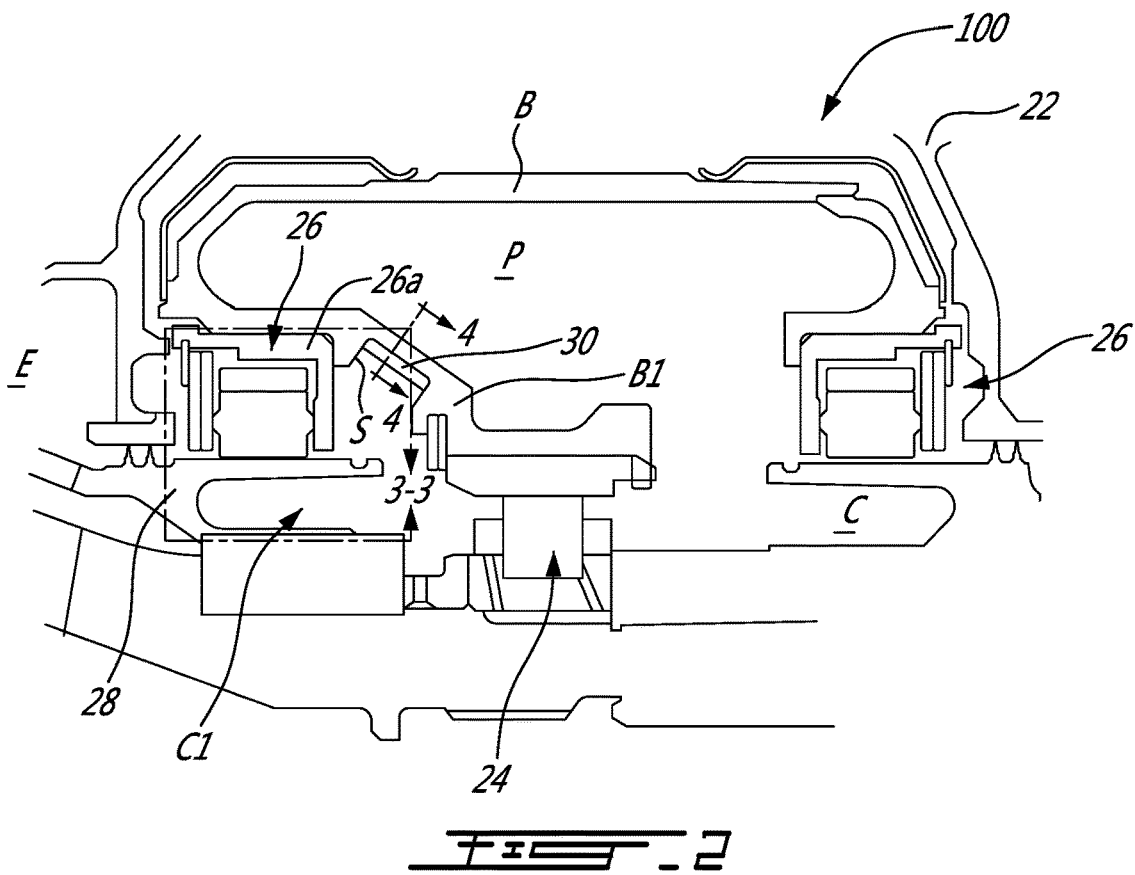
FIG. 2 is an enlarged schematic cross-sectional view of a portion of the gas turbine engine of FIG. 1 in accordance with one embodiment.
Figure 3:
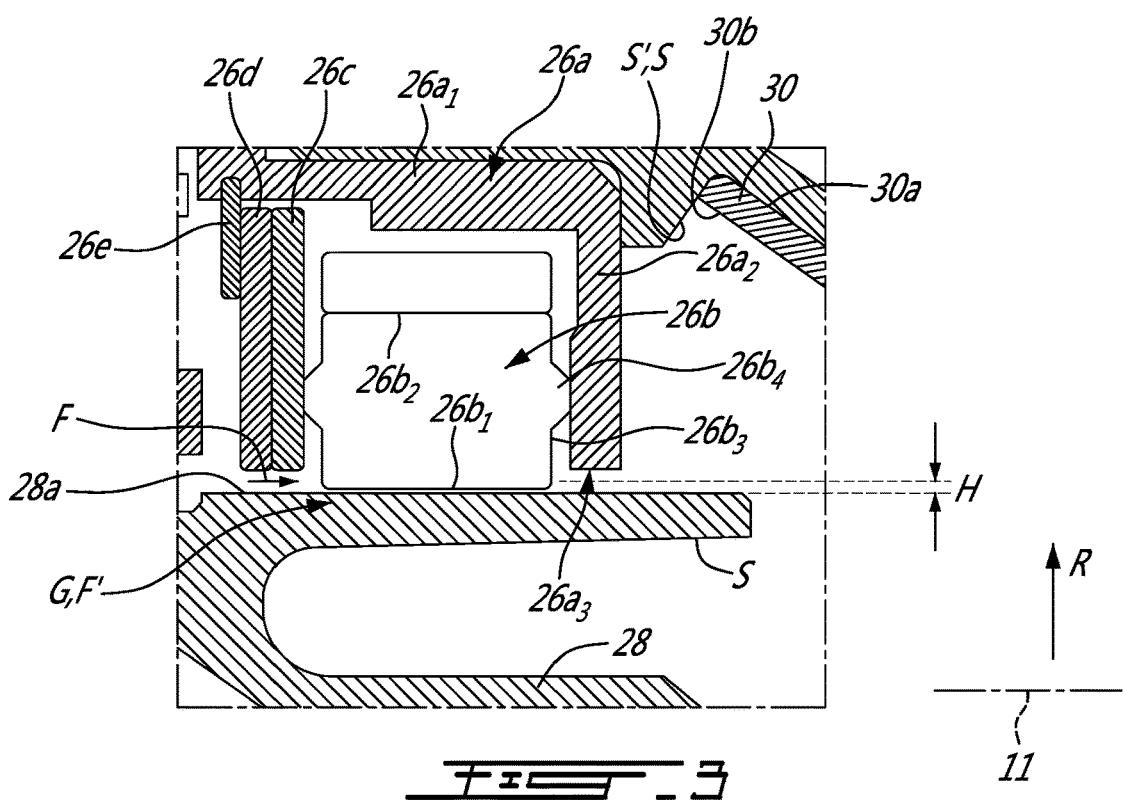
FIG. 3 is an enlarged schematic view of zone 3-3 of FIG. 2.

Referring now to FIGS. 2-3, an assembly for the gas turbine engine is generally shown at 100. The assembly includes one or more bearings 24 located radially inwardly to the engine casing 22 relative to the central axis 11 and located within a bearing cavity C. The bearing cavity C is sealed from an environment E outside the bearing cavity C by seals of the assembly 100 that may be located axially forward and aft of the bearing 24 relative to the central axis 11. In the embodiment shown, one or more of the seals are controlled gap seals 26 that are configured to allow a flow of pressurized air from the environment E outside the bearing cavity C to the bearing cavity C, as the controlled gap seals 26 define a fluid passage F' for fluid flow.

For the sake of simplicity, only one of the controlled gap seals 26 is described herein below using the singular form. It is therefore understood that the below description may apply to both of the controlled gap seals 26 if the gas turbine engine 10 has two or more of the controlled gap seals 26.

The controlled gap seal 26 may be supported by a housing 26a, that may or may not be part of the controlled gap seal 26. The housing 26a may be secured to the engine casing 22. In the embodiment shown, the housing 26a is secured to the engine casing 22 via a bearing housing B. The housing 26a of the controlled gap seal 26 may be an integral part of the bearing housing B. The bearing housing B may be defined by the engine casing 22 of the gas turbine engine 10. The housing 26a of the controlled gap seal 26 extends circumferentially around the central axis 11. As illustrated, a cross-section of the housing 26a of the controlled gap seal 26 may have a L-shape having an axial section $26a_1$ and a radial section $26a_2$ extending radially inwardly from an end of the axial section $26a_1$ relative to the central axis 11.

The controlled gap seal 26 may further include a static component, hereinafter a ring 26b, that is located within the housing 26a. In the embodiment shown, the ring 26b is made of carbon. However, other materials may also be used. The ring 26b extends annularly and continuously around the central axis 11. The ring 26b has a radially inner face $26b_1$ and a radially outer face $26b_2$ radially spaced from the radially inner face $26b_1$ relative to the central axis 11. The ring 26b has side faces $26b_3$ at both axial ends. The side faces $26b_3$ extend at least partially radially from the radially inner face $26b_1$ to the radially outer face $26b_2$, i.e. along a plane incorporating radial direction R in FIG. 1.

One or both of the ring side faces $26b_3$ may define a protrusion $26b_4$ extending axially away from the ring 26b. The protrusion $26b_4$ is in abutment against the radial section $26a_2$ of the housing 26a such that either the compressed air from the environment E or the lubricant from the bearing cavity C may generally be prevented from circulating between the housing radial section $26a_2$ and the ring side face $26b_3$. The protrusion(s) $26b_4$ may be optional as the ring side faces $26b_3$ may abut the radial section $26a_2$ directly.

In some cases, a pressure differential between the environment E outside the bearing cavity C and the bearing cavity C is sufficient for maintaining the ring in abutment against the housing. However, in the embodiment shown, a biasing member 26c may be located between a washer 26d and the ring 26b for pushing the ring 26b in abutment against the housing 26a. As shown, the washer 26d may be retained by a circlip 26e, or other suitable mean, that is received within a groove defined by the housing axial portion $26a_1$. The biasing member 26c may be in abutment directly with the circlip 26e. The biasing member 26c may be a coil spring, an annular rubber ring compressed in installation, a leaf spring, etc.

The controlled gap seal 26 cooperates with a rotating component, herein after a runner 28, that rotates about the central axis 11. It is understood that herein the expression runner may be either directed to an element secured to a rotating component (e.g., the shaft 20) of the gas turbine engine 10 or to the rotating component itself. It is also contemplated to have the reverse arrangement, in which the runner is static and the controlled gap seal 26 rotates. In any event, there is relative rotation between the controlled gap seal 26 and the runner 28.

In the embodiment shown, the runner 28 is disposed concentrically inwardly of the ring 26b. As shown, the runner 28 is located radially inwardly to the ring 26b relative to the central axis 11. The ring 26b and the runner 28 are rotatable relative to one another. The runner 28 has an outer face 28a. At least a part of the runner outer face 28a faces the radially inner face $26b_1$ of the ring 26b.

In the controlled gap seal 26, a sealing action is provided by a cooperation of the runner 28 and the ring 26b. More specifically, the sealing action is provided by a cooperation of the runner face 28a and the ring radially inner face $26b_1$ that are spaced apart from one another by a gap G. As shown, the gap G is a radial gap extending radially from the runner 28 to the ring 26b and axially along the radially inner face $26b_1$ of the ring 26b. The gap G has a height H taken along a radial direction R relative to the central axis 11.

The height H of the gap G is minimized, but allows a flow F of pressurized air from the environment E outside the bearing cavity C toward the bearing cavity C. In a particular embodiment, this flow F of air may prevent or impede the lubricant from flowing from the bearing cavity C to the environment E outside the bearing cavity C via the gap G.

It has been observed that, in some particular operational conditions (e.g., rotational speed, pressures), the flow F of the pressurized air may cause excitation of the runner 28 when the latter is in rotation about the central axis 11. In some circumstances, the excitation may cause cracking of the runner 28 and may decrease its life span. The excitation may be caused by vortex shedding created by the flow F of pressurized air. Vortex shedding correspond to an oscillating flow that takes place when a fluid (e.g., the pressurized air) passes a body at certain velocities. The vortex shedding has frequencies that might correspond to natural modes of the runner 28, ring 26b, or any adjacent components such as the housing 28. Therefore, it might be advantageous to disrupt the flow.

The assembly 100 further includes at least one baffle 30. In the embodiment shown, there are a plurality of baffles 30 circumferentially distributed around the central axis 11. The baffles 30 are located inside the bearing cavity C and may take a plurality of different shapes. The baffles 30 are secured to a surface S inside the bearing cavity C. The surface S may be defined by the bearing housing B, the runner 28, and the housing 26a of the controlled gap seal 26. In the embodiment shown, the surface S delimits at least partially a section C1 of the bearing cavity C that is located axially between the seal 26 and the bearing 24. The baffles 30 may be distributed in a plurality of ways on any of the runner 28, the bearing housing B, and the housing 26a of the controlled gap seal 26. A plurality of possible embodiments are described herein below. In the embodiment shown, the baffle(s) 30 is secured to a bearing housing surface S' of the bearing housing B that is oriented toward the bearing cavity C; the bearing housing surface S' is a surface of the bearing housing that delimits the bearing cavity C while surrounding the seal 26 (and the runner 28).

The baffles 30 may be configured for intersecting the flow of air F circulating in the gap G. The baffles 30 are discontinuities that disrupt a continuity of the surface S. Stated otherwise, the surface S is made of a plurality of surface sections that may all be cylindrical and continuously extending all around the central axis 11. The baffles 30, when secured to one or more adjacent surface sections render the one or more adjacent surface sections discontinuous at an intersection with the baffles 30. In other words, the baffles 30 disrupt a cylindricality of the surface S.

Each of the baffles 30 may be depicted as a fin extending from the surface S inside the bearing cavity C. A fin may be defined as a plate-like wall that projects from a surrounding surface, with a thickness substantially smaller than a height and a length. In the depicted embodiment, the thickness is taken in a circumferential direction relative to the central axis 11; the height is taken from the root of the fin, at the surface S, to the tip; and the length is taken in a direction perpendicular to both of that of the thickness and the height. In a particular embodiment, the height and length of the fin are at least two times greater than its thickness (or at least four time in another embodiment). In a particular embodiment, the height and length of the fin are at least five times greater than its thickness. In a particular embodiment, the height and length of the fin are at least ten times greater than its thickness. In a particular embodiment, a minimal length of the baffles 30 is about 20% of an axially available length within the bearing cavity C. In a particular embodiment, the height is at least 5% of the depth of the bearing cavity C. The width of the baffles 30 is selected such as to meet structural requirements. The baffles 30 are protrusions extending from the surface S and within the bearing cavity C. In a particular embodiment, the baffles 30 are plates protruding from the surface S. The baffles 30 may extend perpendicularly from the surface S.

In the depicted embodiment, the baffles 30 are secured to the bearing housing B and extend both radially inwardly toward the central axis 11 and axially rearward toward the seal 26. As shown, the baffles 30 are secured to a section B1 of the bearing housing B that extends between the seal 26 and the bearing 24 and that may be angled relative to the central axis 11.

In the embodiment shown, a cross-section of the baffles 30 taken on a plane P containing the central axis 11 has a substantially rectangular shape. In the depicted embodiment, the baffles 30 extend away from the bearing housing B and inside the section C1 of the bearing cavity C. A cross-section of the baffles 30 along an axis extending from a root 30a of the baffles 30 to a tip 30b thereof decreases from the root 30a to the tip 30b. Stated otherwise, the baffles 30 may be tapering from their roots 30a to their tips 30b such that a thickness of the baffles 30 taken in a circumferential direction relative to the central axis 11 decreases from their roots 30a to their tips 30b. In the depicted embodiment, a number of the baffles 30 may be at least 10. A number of the baffles 30 may be odd or even. In a particular embodiment, the number of the baffles 30 is selected based on dynamic characteristics of upstream and/or downstream components.

Figure 4:
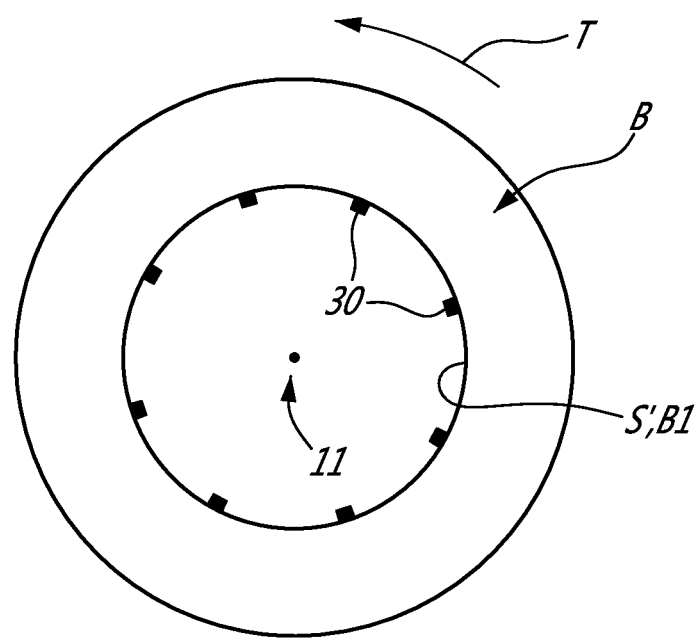
FIG. 4 is a schematic cross-sectional view taken along line 4-4 of FIG. 2.

Referring now to FIG. 4, the baffles 30 are equally spaced from one another and uniformly distributed along a circumferential direction T relative to the central axis 11. Stated otherwise, a distance between two adjacent ones of the baffles 30 may be constant along a full circumference of the bearing housing B.

Figure 5:
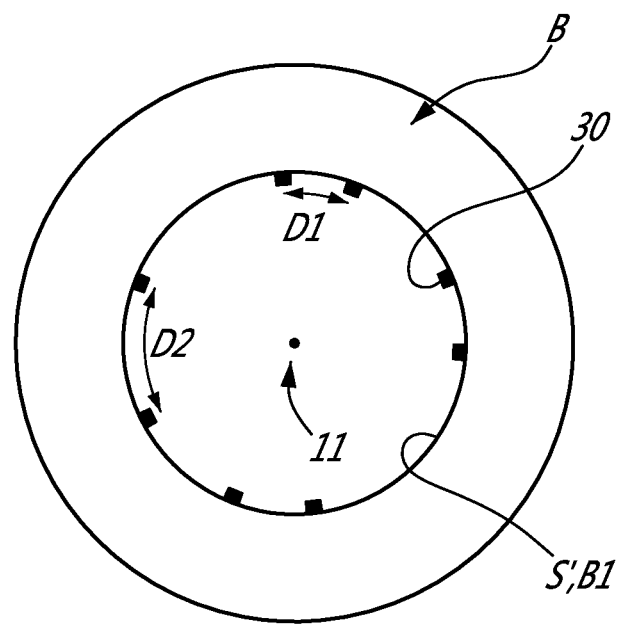
FIG. 5 is a schematic cross-sectional view taken along line 4-4 of FIG. 2 in accordance with another embodiment.

Referring now to FIG. 5, the baffles 30 may be non-equally spaced apart from one another and non-uniformly distributed along the circumferential direction T. In other words, a distance D1, taken along the circumferential direction T, between a first set of two adjacent ones of the baffles 30 is different than a distance D2 between a second set of two adjacent ones of the baffles 30. In a particular embodiment, the distance between each two adjacent ones of the baffles 30 varies throughout a circumference of the bearing housing B. In a particular embodiment, having the baffles 30 equally spaced apart from one another allows the generation of a precise engine order excitation. In a particular embodiment, having the baffles 30 non-equally spaced apart from one another may generate sidebands, which may generally help to attenuate strong excitation generated by equally distributed baffles. Sidebands are spectral components that are the result of amplitude or frequency modulation.

In a particular embodiment, the baffles 30 mistune a fundamental vortex and acoustic frequencies generated by the flow F in the bearing cavity C. A number of the baffles 30 may be determined by a Campbell diagram and/or the vortex frequencies and/or the acoustic frequencies of the bearing cavity.

In a particular embodiment, the baffles 30 mistune the frequency of the vibrations and the natural mode frequency of the runner 28. In a particular embodiment, the baffles 30 allow an acoustic impedance or resistance of a wave generated to change in the bearing cavity C.

Figure 6:
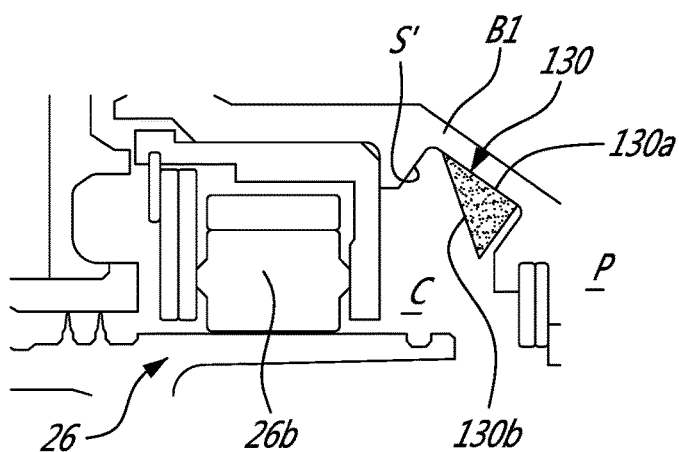
FIG. 6 is a schematic cross-sectional view of a portion of the gas turbine of FIG. 1 in accordance with another embodiment.

Referring now to FIG. 6, baffles in accordance with another embodiment are generally shown at 130. In the embodiment shown, the baffles 130 are secured to the bearing housing internal section B1. A cross-section of the baffles 130 taken along the plane P containing the central axis 11 is substantially triangular. The baffles 130 may taper in cross-section from their roots 130a to their tips 130b such that a thickness of the baffles 130 taken in the circumferential direction relative to the central axis 11 decreases from their roots 130a to their tips 130b. The baffles 130 may be circumferentially uniformly distributed as illustrated in FIG. 4 or non-uniformly distributed as illustrated in FIG. 5. A number of the baffles 130 may be at least 20. A number of the baffles 130 may be odd or even.

Figure 7:
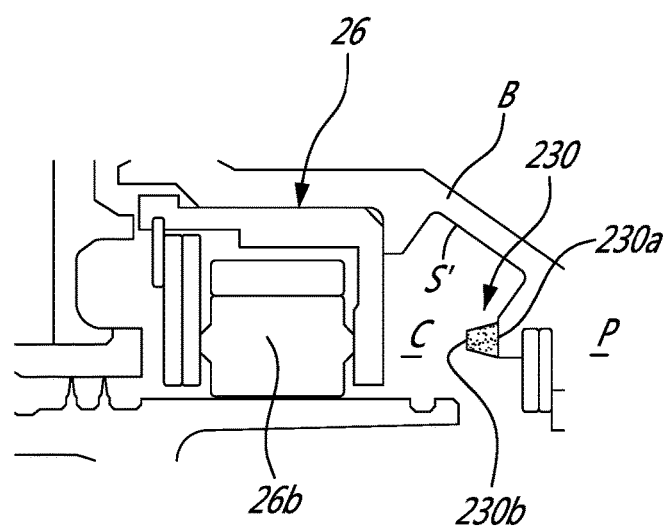
FIG. 7 is a schematic cross-sectional view of a portion of the gas turbine of FIG. 1 in accordance with another embodiment.

Referring now to FIG. 7, baffles in accordance with another embodiment are generally shown at 230. In the embodiment shown, the baffles 230 are secured to the bearing housing B. A cross-section of the baffles 230 taken along the plane P containing the central axis 11 is substantially trapezoidal. In the embodiment shown, the baffles 230 extend from the bearing housing B in an axially rearward direction relative to the central axis 11 toward the seal 26. The baffles 230 may taper in cross-section from their roots 230a to their tips 230b such that a thickness of the baffles 230 taken in the circumferential direction relative to the central axis 11 decreases from their roots 230a to their tips 230b. The baffles 230 may be circumferentially uniformly distributed as illustrated in FIG. 4 or non-uniformly distributed as illustrated in FIG. 5. A number of the baffles 230 may be at least 30. A number of the baffles 230 may be odd or even.

Figure 8:
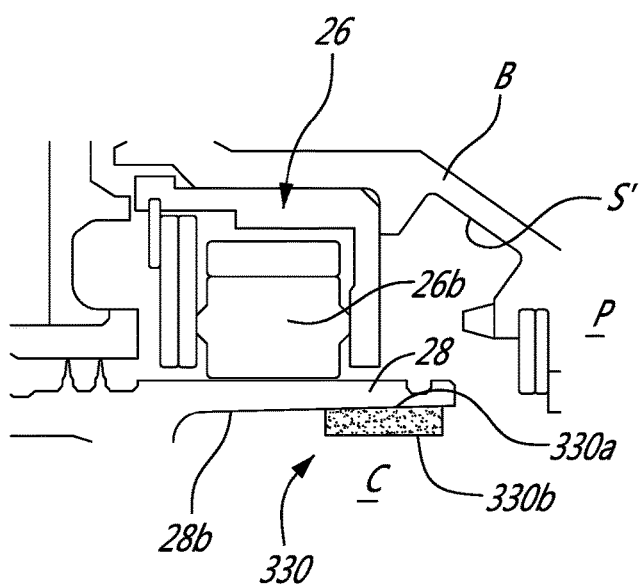
FIG. 8 is a schematic cross-sectional view of a portion of the gas turbine of FIG. 1 in accordance with another embodiment.

Referring now to FIG. 8, baffles in accordance with another embodiment are generally shown at 330. In the embodiment shown, the baffles 330 are secured to the runner 28. More specifically, the baffles 330 are secured to a face 28b of the runner that faces away from the seal 26 and toward the central axis 11. A cross-section of the baffles 330 taken along the plane P containing the central axis 11 is rectangular. The baffles 330 may taper in cross-section from their roots 330a to their tips 330b such that a thickness of the baffles 330 taken in the circumferential direction relative to the central axis 11 decreases from their roots 330a to their tips 330b. The baffles 330 may be circumferentially uniformly distributed as illustrated in FIG. 4 or non-uniformly distributed as illustrated in FIG. 5. A number of the baffles 330 may be at least 40. A number of the baffles 330 may be odd or even. In a particular embodiment, a position of the baffles 330 depends on flow direction. The baffles 330 may be placed so as to directly interact with flow/acoustic waves.

In the embodiment shown, the baffles 30 are linearly shaped. Alternatively, the baffles may be higher-order shaped. Any combinations of the above described features of the baffles 30, 130, 230, 330 is within the scope of the present disclosure. In a particular embodiment, linear baffles will axially guide the flow whereas higher-order shaped baffles will direct the flow to account for the rotational speed of the components and the whirl.

For operating the assembly, a pressure differential is imparted between the bearing cavity C defined by the bearing housing B and the environment E outside the bearing cavity C. The bearing cavity C is fluidly connecting to the environment E via the gap G of a controlled gap seal 26. The flow F circulating from the gap G and inside the bearing cavity C is disrupted with baffles 30, 130, 230, 330 circumferentially distributed around the central axis 11 and located in the bearing cavity C. Disrupting the flow includes disrupting the flow with the baffles 30, 130, 230, 330 being either uniformly or non-uniformly distributed around the central axis 11.

The above description is meant to be exemplary only, and one skilled in the art will recognize that changes may be made to the embodiments described without departing from the scope of the invention disclosed. Still other modifications which fall within the scope of the present invention will be apparent to those skilled in the art, in light of a review of this disclosure, and such modifications are intended to fall within the appended claims.

The invention claimed is:

1. An assembly for a gas turbine engine, comprising:
   a bearing housing circumferentially extending around a shaft rotatable about a central axis and delimiting a bearing cavity;
   a controlled gap seal between the shaft and the bearing housing, the bearing cavity defined between the controlled gap seal and a bearing, the controlled gap seal including a ring and a runner such that the ring and the runner are rotatable relative to one another about the central axis, the runner spaced apart from the ring by a gap, the gap defining a fluid passage between the bearing cavity and an environment outside the bearing cavity; and
   at least one baffle secured to a surface of the bearing housing oriented toward the bearing cavity, the at least one baffle protruding from the surface and extending into the bearing cavity in proximity to the fluid passage to disrupt a fluid flow through the passage.

2. The assembly of claim 1, wherein the at least one baffle has a height defined from a root at the surface to a tip and a thickness taken in a circumferential direction relative to the central axis, the height greater than the thickness.

3. The assembly of claim 2, wherein the height is at least five times greater than the thickness.

4. The assembly of claim 2, wherein the at least one baffle has a length in a direction perpendicular to both of that of the height and the thickness, the length greater than the thickness.

5. The assembly of claim 1, wherein the at least one baffle includes a plurality of baffles circumferentially distributed around the central axis and equally spaced from one another around the central axis.

6. The assembly of claim 1, wherein the at least one baffle includes a plurality of baffles, a distance taken between a first set of two adjacent ones of the plurality of baffles is different than that between a second set of two adjacent ones of the plurality of baffles, the distance being taken along a circumferential direction relative to the central axis.

7. The assembly of claim 1, wherein a cross-section of the at least one baffle taken on a plane containing the central axis has a rectangular shape.

8. The assembly of claim 1, wherein the at least one baffle tapers from its root to its tip.

9. The assembly of claim 1, wherein the at least one baffle includes from 10 to 40 baffles.

10. A gas turbine engine comprising a bearing housing circumferentially extending around a shaft rotatable about a central axis of the gas turbine engine, the bearing housing delimiting a bearing cavity, a controlled gap seal between the bearing housing and the shaft, the bearing cavity defined between the controlled gap seal and a bearing, the controlled gap seal including a static component and a rotating component, the rotating component rotatable about the central axis relative to the static component, a gap between the static and rotating components, the gap defining a fluid passage between the bearing cavity and an environment outside the bearing cavity, at least one baffle secured to a surface of the bearing housing oriented toward the bearing cavity, the at least one baffle including a fin protruding from the surface and extending into the bearing cavity, the fin disrupting a cylindricality of the surface.

11. The gas turbine engine of claim 10, wherein the fin has a height defined from a root at the surface to a tip and a thickness taken in a circumferential direction relative to the central axis, the height greater than the thickness.

12. The gas turbine engine of claim 11, wherein the height is at least five times greater than the thickness.

13. The gas turbine engine of claim 11, wherein the fin has a length in a direction perpendicular to both of that of the height and the thickness, the length greater than the thickness.

14. The gas turbine engine of claim 10, wherein the fin includes a plurality of baffles circumferentially distributed around the central axis and equally spaced from one another around the central axis.

15. The gas turbine engine of claim 10, wherein the fin includes a plurality of fins, a distance taken between a first set of two adjacent ones of the plurality of fins is different than that between a second set of two adjacent ones of the plurality of fins, the distance being taken along a circumferential direction relative to the central axis.

16. The gas turbine engine of claim 10, wherein a cross-section of the fin taken on a plane containing the central axis has a rectangular shape.

17. The gas turbine engine of claim 10, wherein the fin tapers from its root to its tip.

18. The gas turbine engine of claim 10, wherein the fin includes from 10 to 40 fins.

19. A method of operating a bearing assembly, comprising:
   imparting a pressure differential between a bearing cavity defined by a bearing housing and an environment outside the bearing cavity;
   fluidly connecting the bearing cavity to the environment via a gap of a controlled gap seal, the bearing cavity defined between the controlled gap seal and a bearing, the gap located between a rotating component and a static component of the controlled gap seal; and
   disrupting a flow circulating from the gap and inside the bearing cavity with at least one baffle located in the bearing cavity and secured to a surface of the bearing housing oriented toward the bearing cavity.

20. The method of claim 19, wherein disrupting the flow includes disrupting the flow with a plurality of baffles being uniformly distributed around the central axis.

* * * * *